United States Patent [19]

Leibfried

[11] Patent Number: 5,124,423
[45] Date of Patent: Jun. 23, 1992

[54] PROCESS FOR PREPARING ORGANOSILICON POLYMERS

[75] Inventor: Raymond T. Leibfried, Newark, Del.

[73] Assignee: Hercules Incorporated, Wilmington, Del.

[21] Appl. No.: 461,560

[22] Filed: Jan. 5, 1990

Related U.S. Application Data

[60] Division of Ser. No. 79,740, Jul. 30, 1987, Pat. No. 4,900,779, which is a continuation-in-part of Ser. No. 901,092, Aug. 27, 1986, abandoned.

[51] Int. Cl.$^5$ ............................................. C08G 77/04
[52] U.S. Cl. ........................................ 528/15; 528/25; 528/31
[58] Field of Search ............................ 528/15, 25, 31; 525/479; 524/862; 523/222

[56] References Cited

U.S. PATENT DOCUMENTS

| | | | |
|---|---|---|---|
| 2,624,721 | 1/1953 | Hatcher | 528/34 |
| 2,665,287 | 1/1954 | Hatcher | 556/431 |
| 2,823,218 | 2/1958 | Speier | 556/415 |
| 3,197,432 | 7/1965 | Lamoreaux | 528/31 |
| 3,197,433 | 7/1965 | Lamoreaux | 528/31 |
| 3,198,766 | 8/1965 | Nitzsche et al. | 528/15 |
| 3,220,972 | 11/1965 | Lamoreaux | 528/15 |
| 3,929,850 | 12/1975 | Streck et al. | 556/431 |
| 4,011,247 | 3/1977 | Sato et al. | 549/215 |
| 4,599,440 | 7/1986 | Watanabe | 556/480 |
| 4,639,501 | 1/1987 | Seyferth et al. | 528/15 |
| 4,657,965 | 4/1987 | Watanabe | 524/506 |
| 4,719,273 | 1/1988 | Seyferth et al. | 528/15 |
| 4,728,687 | 3/1988 | Watanabe | 524/493 |
| 4,877,820 | 10/1989 | Cowan | 523/222 |
| 4,920,731 | 2/1990 | Leibfried | 523/222 |

FOREIGN PATENT DOCUMENTS

| | | |
|---|---|---|
| 0204171 | 12/1986 | European Pat. Off. |
| 2595363 | 9/1987 | France |
| 2595364 | 9/1987 | France |
| 762112 | 9/1980 | U.S.S.R. |
| 1439945 | 6/1976 | United Kingdom |

OTHER PUBLICATIONS

Toshimi Okada et al., "Asymmetric Hydrosilation of Cyclopentadiene and Styrene with Chlorosilanes Catalysed by Palladium Complexes of Chiral (β-N-Sulfonylaminoalkyl) Phosphines)" *Chemistry Letters*, pp. 999-1002.

V. Vaisarova' et al, "Palladium- and Nickel-Catalyzed Hydrosilylation of Cyclopentadiene", *Collection Czechoslov. Chem. Comm.* vol. 41, pp. 1906-1913 (1976).

Kohel Tamao, "Organofluorosilicates in Organic Synthesis, 12, Preparation of Organopentafluorosilicates and Their Cleavage Reacting by Halogens and N-Bromosuccinimide, Synthetic and Mechanistic Aspects", *Organometallics* 1, pp. 355-368 (1982).

Tamio Hayashi et al, "Optically Active Cyclic Allylsilanes Preparation by Asymmetric Hydrosilylation and Anti Stereochemistry in $S_E'$ Reactions", *Tetrahedron Letters*, vol. 14, No. 50, pp. 5661-5664 (Pergamon Press 1983).

Keiji Yamamoto et al., "Catalytic Asymmetric Hydrosilylation of Olefins III, Chiral Phospine-Palladium (II) Complexes as Hydrosilylation Catalysts", *Journal of Organometallic Chemistry*, 210 pp. 9-17 (1981).

Iwao Ojima et al. "3-TMS-Cyclopentene-1, A New Reagent for the Synthesis of Cyclopentene Derivatives", *Tetrahedron Letters* No. 16, pp. 1385-1388 (Pergamon Press 1977).

Yoshihisa Kiso et al, "Asymmetric Homogeneous Hydrosilation with Chiral Phosphine-Palladium Complexes", *Journal of the American Chemical Society* 94:12 pp. 4373-4374 (Jun. 14, 1972).

Risse et al, "Di- and Tetrafunctional Initiators for the Living Ring-Opening Olefin Metathesis Polymerization of Strained Cyclic Olefins" (1989).

Nogaideli et al, "Hydroxylation of Dicyclopentadiene With Organochlorosilanes and Siloxanes", Soobschh, Akad. Nauk Gruz SSR. 82, No. 3 589 (1976).

Kim et al, "Polycycloalkylene-Siloxan Polymers: Synthesis and Theral Study", 16 *Journal of Polymer Science; Polymer Chemistry* Edition, 483-490 (1978).

*Primary Examiner*—John C. Bleutge
*Assistant Examiner*—R. Dean, Jr.
*Attorney, Agent, or Firm*—Mark D. Kuller; William S. Alexander

[57] ABSTRACT

Novel thermoset and thermoplastic organosilicon polymers, comprised substantially of alternating polycyclic hydrocarbon residues and cyclic polysiloxane or tetrahedral siloxysilane residues linked through carbon-silicon bonds, are disclosed.

20 Claims, No Drawings

PROCESS FOR PREPARING ORGANOSILICON POLYMERS

This is a divisional of U.S. patent application No. 07/079,740, filed Jul. 30, 1987, now U.S. Pat. No. 4,900,779, which is a continuation-in-part of U.S. patent application Ser. No. 901,092, filed Aug. 27, 1986, now abandoned.

This invention relates to a new and novel class of organosilicon polymers and the process of making the same. Specifically, it relates to novel polymers comprised of certain siloxanes and polyunsaturated hydrocarbons and a reaction for making the same.

It has been known for quite some time that compounds containing the hydrosilane (i.e., ≡Si—H) functional group can be reacted with alkenes containing vinyl (terminal) unsaturation to form alkyl silanes. The simplest example of this reaction is the addition of trichlorosilane to ethylene to form ethyl trichlorosilane. This exothermic reaction is catalyzed by platinum halide compounds and proceeds readily to virtually 100% conversion.

This reaction, known as the "hydrosilation" or "hydrosilylation" reaction, has been found effective with a large number of vinyl compounds. Likewise, other silanes such as dialkyl silanes, halo-alkyl silanes, and alkoxy silanes have been found to undergo this reaction so long as they possess the requisite ≡Si-H group.

A number of organosilicon polymers have been disclosed in the prior art which are actually vinyl addition polymers modified with silicon-containing moieties. Polymerization takes place in some cases via conventional olefin polymerization routes without making use of the hydrosilation reaction. The silicon containing moiety is then present as a polymer modifier. Examples of such polymerizations can be found in, e.g., U.S. Pat. No. 3,125,554; U.S. Pat. No. 3,375,236; U.S. Pat. No. 3,838,115; U.S. Pat. No. 3,920,714; and U.S. Pat. No. 3,929,850.

A few instances have been reported in which polymerization takes place via reaction between compounds containing a vinyl silane (≡Si—CH=CH₂) group and a hydrosilane (≡Si—H) group to form highly crosslinked, heat-set polymers. Examples of this type of polymer are found in U.S. Pat. Nos. 3,197,432, 3,197,433 and 3,438,936. Each of these patents teaches the preparation of polymers from vinyl alkyl cyclotetrasiloxanes and alkyl cyclotetrasiloxanes containing 2 to 4 silanic hydrogen atoms.

It is the object of this invention to provide a new class of high molecular weight organosilicon polymers which have outstanding physical, thermal and electrical properties and outstanding resistance to water. It is a further object of this invention to provide a method of preparing the aforesaid high molecular weight organosilicon polymers and to preparing shaped items therefrom.

The novel polymers of this invention are substantially comprised of alternating polycyclic hydrocarbon residues and cyclic polysiloxane or tetrahedral siloxysilane residues linked thru carbon-silicon bonds. They are the reaction product of (a) a cyclic polysiloxane or tetrahedral siloxysilane containing at least two hydrosilane groups and (b) a polycyclic polyene, wherein the ratio of carbon-carbon double bonds in the rings of (b) to hydrosilane groups in (a) is in the range of from about 0.5:1 up to about 1.8:1 and at least one of (a) and (b) has more than two reactive sites (i.e., hydrosilane groups of (a) and carbon-carbon double bonds of the rings of (b)). In one preferred embodiment, wherein the ratio of carbon-carbon double bonds of (b) to hydrosilane groups in (a) is in the range of from about 0.7:1 up to about 1.3:1, the alternating residues form a crosslinked thermoset structure.

Any cyclic polysiloxane or tetrahedral siloxysilane containing two or more hydrogen atoms bound to silicon will enter into the reaction. Cyclic polysiloxanes useful in forming the products of this invention have the general formula:

wherein R is hydrogen, a saturated, substituted or unsubstituted alkyl or alkoxy radical, a substituted or unsubstituted aromatic or aryloxy radical, n is an integer from 3 to about 20, and R is hydrogen on at least two of the silicon atoms.

The tetrahedral siloxysilanes are represented by the general structural formula

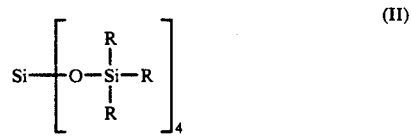

wherein R is as defined above and is hydrogen on at least two silicon atoms in the molecule.

Examples of reactants of Formula (I) include, e.g., trimethyl cyclotrisiloxane, tetramethyl cyclotetrasiloxane, pentamethyl cyclopentasiloxane, hexamethyl Cyclohexasiloxane, tetraethyl cyclotetrasiloxane, cyclotetrasiloxane, terraphenyl cyclotetrasiloxane, tetraoctyl cyclotetrasiloxane and hexamethyl tetracyclosiloxane.

The most commonly occurring members of this group are the tetra-, penta-, and hexacyclosiloxanes, with tetramethyl tetracyclosiloxane being a preferred member. In most cases, however, the material is a mixture of a number of species wherein n can vary widely. Generally, commercial mixtures contain up to about 20% (in purer forms as low as 2%) low molecular weight linear methylhydrosiloxanes, such as heptamethyltrisiloxane, octamethyltrisiloxane, etc.

Examples of reactants of Formula (II) include, e.g., tetrakisdimethylsiloxysilane, tetrakisdiphenylsiloxysilane, and tetrakisdiethylsiloxysilane. The tetrakisdimethylsiloxysilane is the best known and preferred species in this group.

Cyclic polyenes which can be employed are polycyclic hydrocarbon compounds having at least two non-aromatic carbon-carbon double bonds in their rings. Exemplary compounds include dicyclopentadiene, methyl dicyclopentadiene, cyclopentadiene oligomers, norbornadiene, norbornadiene dimer, hexahydronaphthalene, dimethanohexahydronaphthalene, and substituted derivatives of any of these.

The reaction proceeds readily in the presence of a platinum-containing catalyst. Metals salts and complexes of Group VIII elements can also be used. The preferred catalyst, in terms of both reactivity and cost, is chloroplatinic acid ($H_2PtCl_6.6H_2O$). Catalyst concentrations of 0.0005 to about 0.5% by weight, based on weight of the monomer, will effect smooth and substantially complete polymerization. Other platinum compounds can also be used to advantage in some instances, such as $PtCl_2$ and dibenzonitrile platinum dichloride. Platinum on carbon is also effective for carrying out high temperature polymerizations. Other useful platinum catalysts are disclosed in, e.g., U.S. Pat. Nos. 3,220,972, 3,715,334 and 3,159,662. An exhaustive discussion of the catalysis of hydrosilation can be found in Advances in Organometallic Chemistry, Vol. 17, beginning on page 407. The polymerization reactions can be promoted thermally or by the addition of radical generators such as peroxides and azo compounds.

It will be apparent to the artisan that the polymers of this invention can be homopolymers, i.e., reaction products of one hydrosilane-containing reactant and one polycyclic polyene or they can be interpolymers prepared from a plurality of hydrosilane-containing reactants with one or more polycyclic polyenes. Any combination of silane-containing compound and polycyclic polyene is possible so long as the specified ratio of

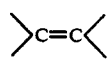

groups to ≡Si—H groups is met.

In one preferred embodiment, the ratio of carbon-carbon double bonds in the rings of (b) to hydrosilane groups in (a) is in the range of from about 0.7:1 up to about 1.3:1, preferably from about 0.8:1 up to about 1.1:1, at least one of (a) and (b) has more than two reactive sites, and the alternating residues form a thermoset polymer. An exemplary crosslinked, thermoset polymer per this invention is the reaction product of one mole of tetrakis dimethyl siloxysilane and 2 moles of norbornadiene which when fully cured, has the idealized general structural formula (the following formulae only depicts the 2,6 isomer, whereas the 2,5 isomer can also be present):

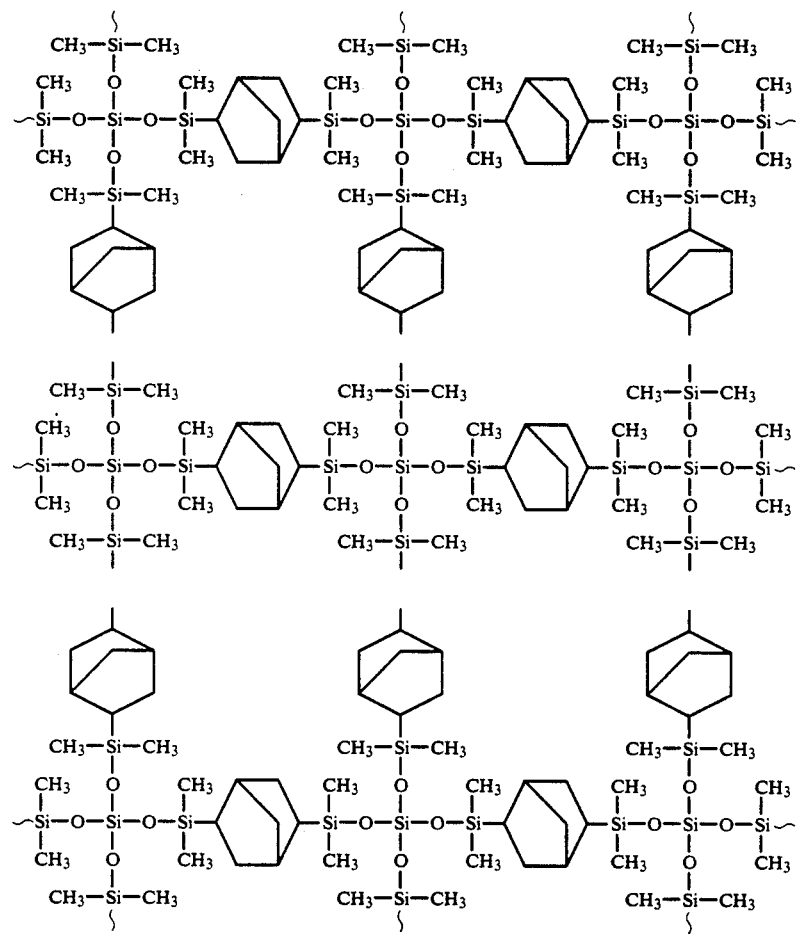

In two other preferred embodiments, wherein the ratio of carbon-carbon double bonds in the rings of (b) to hydrosilane groups in (a) is (i) in the range of from about 0.5:1 up to about 0.7:1 and (ii) in the range of from about 1.3:1 up to about 1.8:1, thermoplastic polymers are formed.

It is possible, by selection of reactants, reactant concentrations and reaction conditions, to prepare polymers within the scope of this invention exhibiting a broad range of properties and physical forms. Thus, it has been found possible to prepare tacky solids, elastomeric materials, and tough glassy polymers.

The unique thermoset polymers of this invention have a range of utilities, depending upon their physical form. Tacky solids are useful as tackifiers in pressure sensitive adhesives and as contact adhesives. They are also useful as structural adhesives, curable in situ, to form strong bonds due to a high affinity of hydrosilane derived silanol groups for polar metal surfaces, especially oxidized metal surfaces. The elastomeric embodiments make excellent potting compounds for electronic applications since they can be cured in situ and are insensitive to water.

Thermal properties of these thermoset polymers are also outstanding. The glass transition temperature (Tg) of a fully cured thermoset polymer is about 200° C. or higher. Thermal stability is excellent with usually less than 10% weight loss at 500° C. during thermogravimetric analysis. At 1100° C. in air, they leave about 50% residue. The thermoset polymers are fire resistant and burn very slowly when subjected to a flame.

A particularly striking property of these thermoset polymers is their virtually total insensitivity to water. They have been found to be unaffected by boiling water after extended periods.

The thermoset polymers are also resistant to oxidation and to ultraviolet radiation at ordinary temperatures. Above 200° C., oxidative crosslinking of silicon portions of the molecule appears to take place, resulting in the formation of a dark siliceous outer layer. This oxidized outer layer appears to impede the oxidative degradation of the polymer.

The tough, glassy thermoset polymers may be useful in many applications where glass is now employed as, e.g., water heater tank liners. The insensitivity of these thermoset polymers to water and their high temperature properties make them ideal for applications of this type. Moreover, the impact resistance of glass fiber-filled polymer, although not extraordinary, is better than that of glass so that lined tanks can withstand the rigors of shipment, handling and installation better than glass.

The tough glassy thermoset polymers pyrolyze upon heating to greater than 1000° C. This high temperature resistance makes them useful as refractory materials, fire resistant materials and ablative materials.

The thermoplastic polymers of this invention generally exhibit melting points in the range of from about 60° C. to about 130° C. However, when post-cured at temperatures greater than 200° C., some (for instance, those having being a

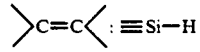

equivalents ratio of 0.45:1.0) exhibit elastomeric characteristics, and, in some instances, they have higher softening points or exhibit thermoset properties after post-cure.

The thermoplastic polymers of this invention range from tacky to hard, non-tacky solids which have low melting points. Some of the polymers (e.g., those having a

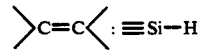

equivalents ratio of 1.45:1.0.) exhibit thermoplastic behavior (melt flow) until they are heated to a higher temperature (200° to 300° C.) where they become thermoset polymers. These can be considered thermoplastic-thermoset polymers. These materials can be coated on substrates as powders, melts, or solutions and cured to give glass transitions somewhat lower than the polymers that have mainly thermoset behavior (e.g., those having

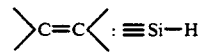

equivalents ratio of about 0.7:1 to about 1.3:1).

To prepare the novel thermoset polymers of this invention, several approaches are available. In the first approach, the correct relative ratios of reactants and the platinum catalyst are simply mixed and brought to a temperature at which the reaction is initiated and proper temperature conditions are thereafter maintained to drive the reaction to substantial completion (typically, with a

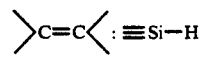

equivalents ratio of about 1:1, where 70 to 80% of the hydrosilane groups are consumed). Normally, periodic temperature increases are desirable to drive the reaction as the molecular weight of the polymer increases. The reaction is normally carried out in a mold, at least up until the point at which sufficient crosslinking has taken place to fix the polymer in the desired shape. Heat treatment can then be continued to drive the reaction further toward completion after removal from the mold, if necessary. This relatively simple approach is a workable method in cases where the two double bonds in the diene molecule are essentially equivalent in their reactivity so that crosslinking begins soon after initiation of the reaction.

Although a hydrosilation reaction via the carbon-carbon unsaturation of the polycyclic polyene rings and the hydrosilane group is the primary polymerization and crosslinking mechanism, other types of polymerization and crosslinking may also take place as the curing temperature is increased. These may include, e.g., oxidative crosslinking, free radical polymerization (olefin addition reactions) and condensation of silanols to form siloxane bonds.

The initial product of the reaction at lower temperatures is often a flowable, heat-curable liquid prepolymer or oligomer (hereafter "prepolymer") even though the ratio of

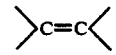

to ≡Si—H is otherwise suitable for crosslinking. Such liquid- prepolymers, analogous to the so-called B-stage resins encountered in other thermoset preparations, can be recovered and subsequently transferred to a mold for curing. These viscous, flowable liquid prepolymers are stable at room temperature for varying periods of time, but, upon reheating to an appropriate temperature, they cure to the same types of thermoset polymers as are prepared when polymerization is carried out substantially immediately.

The B-stage type prepolymers can be prepared by cooling the reaction mass, following the initial exotherm, to about 25° to 65° C. and maintaining it at that point for several hours, and then interrupting the reaction by removing the heat until such time as it is desired to complete the transition to a glassy, crosslinked thermoset polymer. The viscous, flowable liquids will be about 30 to 50% reacted and the viscosity can vary accordingly. By monitoring the viscosity build-up, the practitioner can select, for his own purposes, the point at which the polymerization is to be interrupted.

A unique viscous, liquid B-stage type polymer intermediate can be prepared by the hydrosilation reaction of (a) the cyclic or tetrahedral polysiloxane containing at least two hydrosilane groups and (b) the polycyclic polyene in amounts such that the ratio of

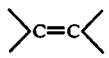

groups in the rings of (b) to ≡Si-H groups in (a) is equal to or greater than about 1.8:1, preferably approximately 2:1. Such polymer intermediates can then be mixed with additional amounts of (a) such that the total ratio of

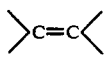

groups in the rings of (b) to ≡Si-H groups in (a) is about 0.7:1 to about 1.3:1, and reacted to form a thermoset polymer. These B-stage type polymer intermediates are stable at room temperature for varying periods of time and, in many instances, may be prepared at one location, stored and transported, all at room temperature, and reacted with additional amounts of (a) at a second location. In addition, they (without the addition of more (a)) will form solids when heated to at least about 200° C. in the presence of air. Thus, these polymer intermediates are well suited for molding operations, and for use in preparing composites, etc.

Another unique B stage type polymer intermediate can be prepared by the hydrosilation reaction of (a) and (b) in amounts such that the ratio of

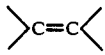

groups in the rings of (b) to ≡Si-H groups in (a) is in the ratio of about 0.2:1 to about 0.5:1, preferably approximately 0.25:1. Such viscous, liquid polymer intermediates can then be mixed with additional amounts of (b), the intermediate described above (having a

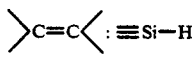

equivalents ratio of greater than 1.8:1), or any other mixture or polymer intermediate that contains an excess of (a), such that the total ratio of

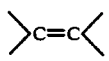

groups in the rings of (b) to ≡Si-H groups in (a) is in the ratio of about 0.7:1 to about 1.3:1. This mix will form a thermoset polymer when subjected to heat.

The thermoplastic polymers can be prepared in substantially the same manner as the thermoset polymers. That is, they may simply be prepared by mixing the correct ratios of reactants and catalyst and brought to the temperature at which the reaction is initiated. Thereafter, proper temperature conditions can be used to drive the reaction to completion. Again, it is preferred for the temperature to be increased periodically as the molecular weight of the polymer increases.

The initial product of the reaction is a viscous, flowable liquid, which may be heated to complete polymerization, as described above. However, since the resultant polymers are thermoplastic, there is generally no need to retain the reactants in the form of a B stage prepolymer, oligomer or thermoplastic polymer intermediate such as those described above, as the polymer can be heated, molded and cooled to form a shaped object. Such thermoplastic polymers can be ground and shipped to a molder where they will be heated and formed into a shaped object. Thus, while liquid prepolymers, oligomers or polymer intermediates can be formed as described above, in most instances it will be preferable to prepare these thermoplastic polymers in the form of a solid, e.g., a powder, ready for use in a molding operation.

A number of options exist for incorporating additives into the polymer. Additives such as fillers and pigments are readily incorporated. Carbon black, vermiculite, mica, wollastonite, calcium carbonate, sand, glass spheres, glass beads, ground glass and waste glass are examples of fillers which can be incorporated. Fillers can serve either as reinforcement or as fillers and extenders to reduce the cost of the molded product. Glass spheres are useful for preparing low density composites. When used, fillers can be present in amounts up to about 80%. Stabilizers and antioxidants are useful to maintain storage stability of B stage materials and thermal oxidative stability of the final product.

Glass or carbon, e.g., graphite, fibers are wetted very well by the liquid prepolymer embodiment making the polymers excellent matrix materials for high strength composite structures. Thus a mold containing the requisite staple or continuous filament can be charged with the prepolymer and the prepolymer cured to form the desired composite structure. Fiber in fabric form can also be employed. In addition, solid thermoplastic polymers may be melted, poured over such fibers, and heated to form composites or thermoplastic polymer powders may be blended with such fibers and, then, heated to form a composite. Fiber reinforced composites of the polymers of this invention can contain as much as 80%, preferably 30 to 60%, by weight, of fibrous reinforcement, and, when fully cured, typically exhibit extremely high tensile and flexural properties and also excellent impact strength. Other types of fibers, e.g., metallic, ceramic and synthetic polymer fibers, also work well.

The glass filled, thermoset products which have been polymerized to the tough glassy state are characterized by high physical properties, i.e., high modulus and high tensile strength and good flex properties. They are fire resistant, burn very slowly when subjected to a flame, and self-extinguish when the flame is removed.

The following examples are presented to demonstrate this invention. They are not intended to be limiting.

EXAMPLE 1

This example shows preparation of a novel thermoset polymer per this invention by reacting dicyclopentadiene and tetrakisdimethylsiloxysilane, with a ratio of carbon-carbon double bonds to hydrosilane groups of 1:1.

A reaction vessel was dried using an $N_2$ flow and a heat gun (300° C. pot temperature), stoppered and placed in a nitrogen flushed glove bag while hot. After equilibrating, the tube was tared on a balance, returned to the glove bag, and 0.027 g of Pt $Cl_2$ was charged. A "dry" ½" magnetic stirrer was charged and the reaction vessel was capped Dicyclopentadiene (2.68 g; 0.02 mole) was charged to the reaction vessel using a 5 cc syringe. This mixture was heated at 90° C. for 2 hours with stirring under slow $N_2$ purge to allow the catalyst complex to form. The sample was cooled to 35° C., tetrakisdimethylsiloxysilane (3.28 g; 0.01 mole) was charged via syringe and the reaction mixture was returned to the 90° C. oil bath. After stirring for about 2 minutes, the sample foamed and darkened. The sample was further heated in the oil bath to 165° C. for 3 hours during which time polymerization occurred as the sample continued to thicken. Additional heat treatments of 190° C. for ½ hour, and 215 to 235° C. for 3 hours were performed. The sample was allowed to cool and removed from the reaction vessel. The final sample was dark, rubbery and tough.

EXAMPLE 2

This example shows preparation of a novel solid B stage polymer intermediate prepolymer by reacting norbornadiene and tetramethylcyclotetrasiloxane, with a ratio of carbon-carbon double bonds to hydrosilane groups of 2:1.

A mixture of 37.6 g (0.40 mole) norbornadiene, 24.0 g (1.10 mole) tetramethylcyclotetrasiloxane, and 0.0101 g (162 ppm) $H_2PtCl_6.6H_2O$ was stirred at room temperature for two days under a blanket of nitrogen. The mixture was heated to 50° C. for 5 hours and 100° C. for 1 hour under nitrogen. The resulting product was stripped at 75° C. and 18 mm Hg to give 57.4 g (93%) of a viscous liquid. There was a slight trace of hydrosilane (Si-H, IR 2145 cm$^{-1}$) left and $Si^{29}$NMR analysis was consistent with the tetra adduct of norbornadiene to tetramethylcyclotetrasiloxane. The product polymerizes to a non-melting solid upon heating to 210° C. for a few minutes in air.

EXAMPLE 3

This example shows preparation of a novel liquid B stage type polymer intermediate by partially reacting norbornadiene and tetrakisdimethylsiloxy silane, with a ratio of carbon-carbon double bonds to hydrosilane groups of 2:1. The resultant polymer intermediate was found to be stable for a period of greater than one year. It can be heated in the presence of air to form a solid polymer.

A mixture of 37.6 g (0.40 mole) norbornadiene, 32.8 g (0.10 mole) tetrakisdimethylsiloxysilane and 0.0100 g (142 ppm) of $H_2PtCl_6.6H_2O$ was stirred at room temperature for two days under a blanket of nitrogen. The mixture was then heated at 50° C. for 5 hours and 100° C. for 1 hour under a nitrogen blanket. The reaction product was stripped of unreacted monomers at 75° C. and 18 mm HG and no condensate appeared overhead. The product was a low viscosity blend (70.0 g, 99% of theoretical). No Si-H appeared at 2145 cm$^{-1}$ and $Si^{29}$ NMR analysis was consistent with the tetra adduct of norbornadiene to tetrakisdimethylsiloxysilane. The product was still a low viscosity fluid after one year standing at room temperature. A few days after the preparation, a sample was polymerized to a non-melting solid by heating to 210° C. for a few minutes.

EXAMPLE 4

This example shows preparation of a film comprising a novel thermoset polymer per this invention, i.e., the reaction product of tetramethylcyclotetrasiloxane and norbornadiene, with a ratio of carbon-carbon double bonds to hydrosilane groups of 1:1.

Chloroplatinic acid (0.0030 g, 200 ppm) was charged to a reaction vessel under a nitrogen sweep. The reaction vessel was capped and 8.57 g (0.035 mole) tetramethylcyclotetrasiloxane and 6.43 g (0.070 mole) norbornadiene were charged to the sealed reaction vessel by syringe. The reaction vessel contents were blanketed under nitrogen and stirred while heating at 50° C. for 2.5 hours. After two hours the initial yellow color disappeared and the viscosity of the fluid increased. After the 2.5 hours at 50° C. the reaction mixture was diluted by injecting 15 ml dry xylene and filtered through #41 paper to remove insoluble black catalyst residues. The resulting polymer contained 10 to 50 ppm Pt (x-ray analysis).

Films of the filtered toluene solution fifteen mils thick were cast on glass plates with a doctor blade and the xylene was allowed to evaporate overnight. The films on the glass were heated at 100° C. for 70 hours under nitrogen and then at 200° C. for 4 hours. The films were immersed in water for a few hours at room temperature and they released from the glass. A visible/UV analysis showed no significant absorbance for these films from 220 to 800 nm.

EXAMPLE 5

This example shows preparation of a molded, glass cloth reinforced, article comprising a novel thermoset polymer per this invention by preparing a B stage prepolymer by partially reacting dicyclopentadiene and tetramethylcyclotetrasiloxane (ratio of carbon-carbon double bonds to hydrosilane groups of 1:1), injecting the B stage prepolymer into a mold, and heating to complete polymerization.

Chloroplatinic acid (0.0101 g) was charged to a dry 750 ml reaction vessel in a $N_2$ filled glove bag and the reaction vessel was sealed. Dry dicyclopentadiene (26.44 g, 0.2 mole) was charged by syringe. This mixture was heated at 55° C. for one hour to form a dicyclopentadiene/$H_2PtCl_66H_2O$ catalyst complex. Dry tetramethylcyclotetrasiloxane (24.05 g, 0.10 mole) was added gradually at 56° C. and an immediate exotherm took the temperature to 174° C. The mixture was cooled to 64° to 65° C. and held there for 1.5 hour. $Si^{29}$NMR shows that the hydrosilation reaction is about 50% complete at this time. The low viscosity product was removed from the reaction vessel by syringe and injected into a teflon coated mold containing glass cloth which exactly filled the mold cavity. The resin in the mold was degassed at 60° C. under a slight vacuum in a vacuum oven. The aspirator vacuum was manually controlled to keep the resin from foaming out of the mold. The mold was heated in an oven at 68° C. for 18 hours and then at 140° to 150° C. for 3 days. The oven was cooled slowly and the mold unclamped to give a very hard, stiff 5"×5"×⅛" plaque. Samples were cut for rheological, tensile, and flexural property determinations and the following data were obtained:

| 60% Glass Cloth, 40% Tetramethylcyclotetrasiloxane/ Dicyclopentadiene | |
| --- | --- |
| Tensile Strength | 23,800 psi |
| Tensile Modulus | $1.2 \times 10^6$ psi |
| % Elongation (break) | 2.2 |
| Flexural Strength | 40,400 psi |
| Flexural Modulus | $2.2 \times 10^6$ psi |
| Rockwell R Hardness | 119 |
| Glass Transition Temp (Rheometrics) | 160° C. |
| Notched Izod Impact. | 10 ft lb/in notch |
| Heat Distortion Temperature (264 psi) | 300° C. |

EXAMPLE 6

This example shows preparation of a novel thermoset polymer per this invention by reacting norbornadiene and tetramethylcyclotetrasiloxane with a ratio of carbon-carbon double bonds to hydrosilane groups of approximately 1:1.

A dry, $N_2$ sparged vessel was charged with a stir bar and 0.0021 g of $H_2PtCl_6.6H_2O$. The vessel was capped and charged with 4.47 g (0.05 mole) of norbornadiene. The resulting mixture was stirred for thirty minutes at 60° C. Tetramethylcyclotetrasiloxane (5.83 g, 0 024 mole) was added and the reaction mixture gelled about three hours later. The sample was removed from the reaction vessel and cured at 150° C. for 16 hours, 250° C. for 2 hours and 280° C. for 16 hours to give a brown, glassy solid.

EXAMPLE 7

This example show preparation of a novel thermoset polymer per this invention by reacting dicyclopentadiene and methylcyclotetrasiloxane, with a ratio of carbon-carbon double bonds to hydrosilane groups of approximately 1:1.

Following the general procedure in Example 6, tetramethylcyclotetrasiloxane (18.1 g, 0.075 mole) was added to a heated (60° C.) mixture of dicyclopentadiene (20.12 g, 0.152 mole) and $H_2PtCl_6.6H_2O$ (0.0076 g). The reaction mixture exothermed to 186° C. 30 seconds after the tetramethylcyclotetrasiloxane addition. The reaction mixture was stirred for 16 hours at 60° C., 24 hours at 70° C. and 5 hours at 150° C. The mixture was poured into an aluminum pan and cured for 12 hours at 200° C., 2 hours at 225° C., 2 hours at 250° C. and 16 hours at 280° C. to give a brown glassy solid.

The thermal stability of the polymers of Examples 6 and 7 are presented in the following table.

| Example No. | TGA (20° C./Min.) | |
| --- | --- | --- |
| | 10% Wt. Loss (°C.) | % Residue (1100° C.) |
| 6 | 520 | 63 |
| 7 | 510 | 39 |

EXAMPLE 8

This example show preparation of a novel molded, thermoset polymer per this invention by reacting dicyclopentadiene and methylcyclotetrasiloxane, with a ratio of carbon-carbon double bonds to hydrosilane groups of approximately 1:1.

Following the general procedure in Example 6, tetramethylcyclotetrasiloxane (49.76 g, 0.20 mole) was added to a heated (70° C.) mixture of dicyclopentadiene (54.71 g, 0.414 mole) and $H_2PtCl_6.6H_2O$ (0.0209 g). Thirty seconds after the tetramethylcyclotetrasiloxane addition, the reaction mixture exothermed to 170° C. The reaction mixture was stirred for 16 hours at 130° C. and poured into a teflon coated mold. The sample was cured for 16 hours at 150° C. to give an opaque, glassy solid.

EXAMPLE 9

This example show preparation of a molded, glass cloth reinforced, article comprising a novel thermoset polymer per this invention. A B stage prepolymer was prepared by partially reacting dicyclopentadiene and tetramethyl cyclotetrasiloxane in amounts such that the ratio of carbon-carbon double bonds to hydrosilane groups was 1.1:1. Then, the B stage prepolymer was poured into a mold containing a glass cloth and was heated to complete polymerization.

Following the general procedure in Example 6, tetramethylcyclotetrasiloxane (28.6 g, 0.12 mole) was added to a heated (55° C.) mixture of dicyclopentadiene (34.4 g, 0.26 mole) and $H_2PtCl_6.6H_2O$ (0.0126 g). Thirty seconds after the tetramethyl cyclotetrasiloxane addition, the reaction mixture exothermed to 184° C. The reaction mixture was stirred for 2 hours at 80° C. then transferred to a teflon-coated mold containing 50.9 g woven glass cloth. The sample was cured for 12 hours at 130° C., 160° C. for eight hours, and 180° C. for 16 hours to give a opaque, glassy plaque containing 60.7 wt. % glass cloth. This plaque was further cured in a $N_2$ flushed oven at 200° C., 250° C. and 310° C. for 4 hours at each temperature.

EXAMPLE 10

This example show preparation of a molded, opaque solid plaques comprising a novel thermoset polymer per this invention, by preparing a B stage prepolymer by partially reacting dicyclopentadiene and tetramethyl cyclotetrasiloxane (ratio of carbon-carbon double bonds to hydrosilane groups of 1:1), transferring the B stage prepolymer into a mold, and heating to complete polymerization.

Following the general procedure in Example 6, tetramethylcyclotetrasiloxane (76.36 g, 0.32 mole) was added to a heated (30° C.) mixture of dicyclopentadiene (83.9 g, 0.64 mole) and $H_2PtCl_6.6H_2O$ (0.0148 g). Five minutes after this addition the reaction mixture exothermed to 193° C. The reaction mixture was stirred for 1 hour at 55° to 70° C., transferred to teflon-coated molds and cured at 145° C. for 18 hours under slight vacuum. The opaque solid plaques were further cured to 285° C. in a $N_2$ flushed oven.

The polymers of Examples 9 and 10 were further subjected to mechanical analysis to determine their glass transition temperature (Tg) and storage modulus (G') at various temperatures. Results are recorded in the following table.

| Example[1] | Mechanical Analysis | | | | | | |
| --- | --- | --- | --- | --- | --- | --- | --- |
| | Wt. % Glass | Tg (°C.) | G' (GPa) at T (°C.) | | | | |
| | | | 25 | 100 | 140 | 180 | 200 |
| 9(a) | 60.7 | 275 | 2.7 | 2.2 | 2.0 | 1.8 | 1.6 |
| (b) | 60.7 | 300 | 2.5 | 2.1 | 1.8 | 1.5 | 1.4 |
| 10(a) | 0 | 245 | 0.8 | 0.57 | 0.50 | 0.43 | 0.35 |
| (b) | 0 | 250 | 0.78 | 0.60 | 0.50 | 0.40 | 0.35 |

[1](a) Denotes data before water boil.
(b) Denotes data after 5 day water boil.

The data in this table demonstrate the relative water insensitivity of the organosilicon polymers of this invention. The weight gained after 5 days in boiling water was about 0.1%.

EXAMPLE 11

This example shows preparation of a novel thermoset polymer per this invention by reacting a dicyclopentadieneoligomer comprising about 58.43% dicyclopentadiene, 43.75% tricyclopentadiene and 5.05% tetracyclopentadiene (analyzed by G.C.), and tetramethylcyclotetrasiloxane (ratio of carbon-carbon double bonds to hydrosilane groups of 0.86:1).

A complex of 0.0076 g of $H_2PtCl_6 \cdot 6H_2O$ and 21.71 g (0.12 mole) of the dicyclopentadiene oligomer was prepared by heating the two materials under a dry nitrogen blanket for one hour at 50° C. Tetramethylcyclotetrasiloxane (16.10 g, 0.07 mole) was added to the yellow complex (complex temperature was 71° C.). The reaction exothermed to 153° C. in 8 seconds. The yellow solution was cooled to 30° C., poured into Teflon coated slotted molds and cured at 150° C./16 hours and 200° C./4 hours. The ½"×3"×⅛" test pieces were removed from the mold and post cured at 100° C./0.5 hours, 150° C./0.5 hours, 200° C./2 hours, 225° C./2 hours, 250° C./2 hours and 280°/16 hours.

EXAMPLE 12

This example shows preparation of a novel polymer outside the scope of this invention by reacting norbornadiene dimer and bisdimethylsilyl ethylene both of which contain two reactive sites (ratio of carbon-carbon double bonds to hydrosilane groups of 1:1).

A complex of $H_2PtCl_6 \cdot 6H_2O$ and norbornadiene dimer (pentacyclotetradeca-5,11-diene) was prepared by heating 0.0037 g of $H_2PtCl_6 \cdot 6H_2O$ under a nitrogen blanket with 10.35 g (0.055 mole) of dry norbornadiene dimer for 1 hour at 55° to 60° C. This gives a clear yellow solution. Bisdimethylsilyl ethylene (8.16 g, 0.055 mole) was added and the resulting solution was heated to 58° C. The reaction exothermed to 172° C. within three minutes and the reaction mixture was highly viscous upon cooling to 53° C. The mixture was poured into a slotted mold and heated overnight at 120° C. then heated to 160° C. for 6 hours and then at 180° C. overnight. The polymer was very viscous at 180° C. and at 160° C. clear filaments could be drawn from the melt. The IR band for Si-H (2110 cm$^{-1}$) had essentially disappeared and the olefin double bonds at 4.6 ppm by proton NMR were barely detectable. The resulting clear, glassy, thermoplastic polymer softens at 112° to 120° C.

EXAMPLE 13

This example shows the preparation of a molded article comprising a novel thermoset polymer per this invention, by partially reacting dicyclopentadiene and tetramethylcyclotetrasiloxane (ratio of carbon-carbon double bonds to hydrosilane groups of 1:1) to form a B stage type prepolymer, injecting the B stage prepolymer into a mold, and heating to complete polymerization.

The catalyst $H_2PtCl_6 \cdot 6H_2O$ (0.0148 g) was charged to a dried 25 oz. reaction vessel and sealed. Under a nitrogen blanket 83.95 g (0.635 mole) dicyclopentadiene were charged by syringe. The catalyst and dicyclopentadiene were heated for 90 minutes at 60° to 70° C. giving a yellow solution which was cooled to 30° C. Tetramethylcyclotetrasiloxane 76.36 g, 0.317 mole) was added and an exothermic reaction started in two minutes, eventually reaching 193° C. After cooling to 55° C., a sample was injected into a 5"×5"×⅛" teflon lined aluminum mold. The polymer was polymerized at temperatures ranging from 120° to 280° C. under a blanket of nitrogen. Some electrical properties of the cured polymer are given below:

| Dielectric Constant | 2.87 | 60 Hz |
|---|---|---|
|  | 2.83 | 1 MHz |
| Dissipation | 0.0001 | 60 Hz |
| Factor | 0.0002 | 100 KHz |
| Volume Resistivity ohm-cm | $1.6 \times 10^{18}$ |  |
| Dielectric Strength v/mil | 381 |  |

A sample of the Example 14 polymer was immersed in boiling water for five days. The sample weight increased 0.1%. The dimensions of the sample (6.75, 1.30 cm, 0.32 cm) were unchanged after the boiling water treatment. The modulus/temperature curve and glass transition temperature (250° C.) were also unchanged by the boiling water treatment.

EXAMPLE 14

This example shows preparation of a novel thermoplastic polymer per this invention by reacting dicyclopentadiene and methylhydrocyclosiloxanes, with a ratio of carbon-carbon double bonds to hydrosilane groups of 0.5:1.

Chloroplatinic acid (0.0120g) was weighed into an 8 oz. reaction vessel under a nitrogen blanket in a dry box and the septum was sealed. Dry dicyclopentadiene (23.01 g, 0.174 mole, 0.348 gram equivalents of olefin) was injected into the reaction vessel by a hypodermic syringe The contents of the reaction vessel were heated to 60° to 65° C. for 1 hour, under a nitrogen blanket, and the chloroplatinic acid dissolved. Dry air was swept through the reaction vessel for 10 to 15 minutes and the contents were cooled to 31° C. Methylhydrocyclosiloxanes, consisting of 54% tetramethyl cyclotetrasiloxane, 20% pentamethyl cyclopentasiloxane, 5% hexamethyl cyclohexasiloxane, 19% higher methylhydrocyclosiloxanes (up to approximately $((CH_3(H)SiO\text{-})_{20})$, and 2% linear methylhydrosiloxanes, were injected and the reaction exothermed to 179° C. After cooling the reaction product to 60° C., it was poured into a teflon coated stainless steel mold. The mold was placed into a vacuum oven and a vacuum applied (approximately 15 mm Hg pressure, vacuum pump) for 10 to 15 minutes. Then, the mold was heated under nitrogen for 15 hours at 130° C., for 6 hours at 160° C., for 16 hours at 180° C., for 4 hours at 200° C., and for 4 hours at 225° C. Attempts to obtain thermoset behavior were then abandoned. The final product was extremely viscous at room temperature The final product can be blended with a mixture having a ratio of carbon-carbon double bonds to hydrosilane groups of, e.g, 1.5:1 to 1.75:1 to form a composition with thermoplastic behavior and then heated to 150° to 285° C. to form a thermoset polymer. For instance, the polymer of example 21 and this polymer might be heated to 130° to 140° C., mixed in equal amounts, and cooled to form a thermoplastic blend that can be cured upon further heating (approximately 150° to 285° C.).

EXAMPLE 15

This example shows preparation of a novel thermoset polymer per this invention, by reacting dicyclopentadiene and methylhydrocyclosiloxanes in the same manner as in example 14, except that the monomers were used in amounts such that the ratio of carbon-carbon double bonds to hydrosilane groups was 0.7:1 and the final heating was for 6 hours at 180° C., for 6 hours at 225° C., for 2 hours at 235° C., and for 4 hours at 285° C.

The polymer of this example exhibits thermoset behavior when polymerized at 225° C. The polymer does not have a melting point, but softens at 100° C. to a soft extendable elastomer. The polymer is a tough, leather like solid at room temperature It is flexible enough to be twisted 360° before tearing.

EXAMPLE 16

This example shows preparation of a novel thermoset polymer per this invention by reacting dicyclopentadiene and methylhydrocyclosiloxanes in the same manner as in example 14, except that the monomers were used in amounts such that the ratio of carbon-carbon double bonds to hydrosilane groups was 0.85:1.

The thermoset polymer formed after heating to 225° C. was tougher than that found in example 16. This hard, solid polymer maintains a high modulus up to 200° C. and exhibits elastomeric behavior when heated to 235° C.

EXAMPLE 17

This example shows preparation of a novel thermoset polymer per this invention by reacting dicyclopentadiene and methylhydrocyclosiloxanes in the same manner as in example 14, except that the monomers were used in amounts such that the ratio of carbon-carbon double bonds to hydrosilane groups of 1.15:1 and the final heating was for 4 hours at 150° C., for hours at 235° C., and for 4 hours at 285° C.

EXAMPLE 18

This example shows preparation of a novel thermoset polymer per this invention by reacting dicyclopentadiene and methylhydrocyclosiloxanes in the same manner as in example 17, except that the monomers were used in amounts such that the ratio of carbon-carbon double bonds to hydrosilane groups of 1.30:1.

All the polymers produced in examples 16 to 18 exhibited thermoset characteristics and did not melt or lose their shape at temperatures below the decomposition points of the polymers (400° to 500° C.). Polymers prepared from reactants having a carbon-carbon double bond:hydrosilane equivalents ratio near 1:1 were post-cured at 285° to 300° C. to increase their glass transition temperature to the 260° to 300° C. range. The crosslink density of such polymers was high enough to prevent segmental motion and network deformation.

EXAMPLE 19

This example shows preparation of a novel thermoset polymer per this invention by reacting dicyclopentadiene and methylhydrocyclosiloxanes in the same manner as in example 15, except that the monomers were used in amounts such that the ratio of carbon-carbon double bonds to hydrosilane groups was 1.46:1 and the final heating was for 6 hours at 150° C., for 6 hours at 200° C., for 2 hours at 235° C., and for 4 hours at 285° C.

Example 19 demonstrates polymerization in the transition range from thermoset behavior to thermoplastic behavior. When polymerized up to 200° C., the sample softened to a highly compressible elastomer at about 120+ to 125° C. When the sample was post-cured at 285° C., the glass transition temperature was raised to only 200° C. The degree of crosslinking was limited by available hydrosilane groups.

EXAMPLE 20

This example shows preparation of a novel thermoplastic polymer per this invention by reacting dicyclopentadiene and methylhydrocyclosiloxanes in the same manner as in example 14, except in amounts such that the ratio of carbon-carbon double bonds to hydrosilane groups was 1.61:1 and the final heating was for 6 hours at 150° C., for 6 hours at 200° C., for 8 hours at 235° C., and for 4 hours at 285° C.

EXAMPLE 21

This example shows preparation of a novel thermoplastic polymer per this invention by reacting dicyclopentadiene and methylhydrocyclosiloxanes in amounts such that the ratio of carbon-carbon double bonds to hydrosilane groups was 1.75:1.

A catalyst solution containing 600 ppm chloroplatinic acid was prepared by heating 0.0953g of chloroplatinic acid with 158.8g dicyclopentadiene to 70° C. for 1.5 hours in a sealed 8 ounce reaction vessel, under nitrogen. A 150 ppm chloroplatinic acid solution was prepared by diluting 30g of the above catalyst solution with 90g of dicyclopentadiene. A portion of the resultant chloroplatinic acid solution (7.92g) was weighed into a 7 inch reaction vessel with 4.59g of dicyclopentadiene, making a 95 ppm concentration of chloroplatinic acid in dicyclopentadiene (0.185 gram equivalent of olefin). Then, 7.21 g (0.106 hydrosilane equivalents) of methylsiloxanes (described in example 15) were injected into the sealed reaction vessel at 23° C. The reaction mixture was heated to 36° C. and a slight exotherm raised the temperature to 60° C., where the mixture became viscous. A vacuum (15 mm Hg) was applied to the contents of the reaction vessel at 45° C. for 10 minutes to pull gas out of the reaction product. The product was poured into a teflon coated stainless steel mold and heated in a nitrogen blanket for 6 hours at 150° C., for 20 hours at 200° C., and for 6 hours at 225 to 235° C. The 3"×1"×1" specimens removed from the mold were transparent, hard solid with a melting point of 117° to 125° C. This solid could be ground into a crystalline powder.

The polymers of examples 20 and 21 do not form a complete polymeric network, even when they are polymerized at 225° to 235° C. They are completely thermoplastic and form a viscous, flowable liquid above their melting points. The solids can be ground into powder.

The properties of the polymers prepared in examples 14 to 21 are shown in the following Table.

| | Organosilicon Polymers (Examples 15 to 22) Dicyclopentadiene/Methylhydrocyclosiloxane | | | | | | | |
|---|---|---|---|---|---|---|---|---|
| | Example No. | | | | | | | |
| | 14 | 15 | 16 | 17 | 18 | 19 | 20 | 31 |
| >C=C<:≡Si—H Equiv. Ratio | 0.50 | 0.70 | 0.85 | 1.15 | 1.30 | 1.46 | 1.61 | 1.75 |
| Chloroplatinic Acid Catalyst (ppm) | 185 | 175 | 174 | 178 | 177 | 179 | 181 | 95 |
| Max. Polymerization Temp. (°C.) | 225 | 225 (285) | 225 | 150 | 150 (285) | 200 (285) | 235 | 225 |
| Melting/Softening Point | viscous fluid | SP 100 | >300 | >300 | >300 | SP 120-125 | MP 120-125 | MP 117-125 |
| Glass Transition Temp. (°C.) | | | | | | | | |
| Mechanical | — | 100 | 235 | 155 | 135 (210) | 120 (200) | — | — |
| Thermal DSC* | — | — | — | — | 180 | 88 | — | — |
| Initial Weight Loss TGA, °C., (% residue, 1000° C.) | | | | | | | | |
| $N_2$ | — | — | — | — | 460 (43.5) | 460 (45.9) | 450 (44.1) | 500 (47.0) |
| Air | — | — | — | — | 470 (35.6) | 470 (33.7) | 450 (34.0) | 500 (33.4) |

*Differential Scanning Calorimeter.

EXAMPLE 22

This example shows preparation of graphite fiber composite.

Chloroplatinic acid (0.0185g) was weighed into a reaction vessel in a dry box and the reaction vessel was sealed. Dicyclopentadiene (47.15g, 0.357 mole, 0.714 equivalents) was injected into the reaction vessel and the mixture was heated with stirring to 60° C. for 1 hour. After cooling to 36° C., tetramethylcyclotetrasiloxane (44.67g) was injected. In two minutes, the sample exothermed to 192° C. The product was cooled and injected into a teflon lined mold 5"×5"×⅛" containing ten 5"×5" sheets of square woven graphite fiber cloth. The loaded mold was heated in a nitrogen blanketed oven for 15 hours at 130° C., for 6 hours at 160° C., and for 12 hours at 180° C. The resulting composite had good flexural strength (68,000 psi) and modulus (4.7×10⁶ psi).

While this invention has been described with respect to specific embodiments, it should be understood that these embodiments are not intended to be limiting and that many variations and modifications are possible without departing from the scope of this invention.

What is claimed:

1. A method of preparing a crosslinked organosilicon polymer comprised substantially of alternating polycyclic hydrocarbon residues and cyclic polysiloxane or tetrahedral siloxysilane residues linked through carbon-silicon bonds, which method consisting essentially of providing (a) a cyclic polysiloxane or tetrahedral siloxysilane containing at least two ≡SiH groups and (b) a polycyclic polyene having at least two non-aromatic carbon-carbon double bonds in its rings, wherein the ratio of carbon-carbon double bonds in the rings of (b) to ≡SiH groups in (a) is in the range of about 0.5:1 up to about 1.8:1 and at least one of (a) and (b) has more than two reactive sites and reacting the cyclic polysiloxane or the tetrahedral siloxysilane (a) and the polycyclic polyene (b) in the presence of a platinum-containing catalyst and subjecting said polymer to heat to drive said crosslinking to a maximum.

2. The method of claim 1 wherein the cyclic polysiloxane or tetrahedral siloxysilane containing at least two ≡SiH groups is selected from the class consisting of:

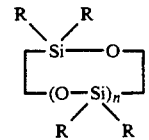

wherein R is hydrogen, a substituted or unsubstituted alkyl, alkoxy, aromatic or aryloxy radical, n is an integer from 3 to about 20, and R is hydrogen on at least two of the silicon atoms; and

wherein R is as defined above and is hydrogen on at least two silicon atoms in the molecule.

3. The method of claim 2 wherein the silicon containing residue is a polyvalent residue based on a cyclic polysiloxane or a mixture of cyclic polysiloxanes.

4. The method of claim 2 wherein the silicon-containing residue is a polyvalent residue based on a tetrahedral siloxysilane or a mixture of tetrahedral siloxysilanes.

5. The method of claim 1 wherein the polycyclic hydrocarbon residue is a divalent saturated residue based on norbornadiene.

6. The method of claim 3 wherein the polycyclic hydrocarbon residue is a divalent saturated residue base on norbornadiene.

7. The method of claim 4 wherein the polycyclic hydrocarbon residue is a divalent saturated residue based on norbornadiene.

8. The method of claim 1 wherein the polycyclic hydrocarbon residue is a saturated divalent residue based on dicyclopentadiene.

9. The method of claim 3 wherein the polycyclic hydrocarbon residue is a saturated divalent residue based on dicyclopentadiene.

10. The method of claim 4 wherein the polycyclic hydrocarbon residue is a saturated divalent residue based on dicyclopentadiene.

11. The method of claim 1 wherein the polycyclic polyene is selected from the class consisting of norbornadiene, dicyclopentadiene, tricyclopentadiene, hexahydronaphthalene, dimethanohexahydronaphthalene and norbornadiene dimer.

12. The method of claim 3 wherein the polycyclic polyene is selected from the class consisting of norbornadiene, dicyclopentadiene, tricyclopentadiene, hexahydronaphthalene, dimethanohexahydronaphthalene and norbornadiene dimer.

13. The method of claim 4 wherein the polycyclic polyene is selected from the class consisting of norbornadiene, dicyclopentadiene, tricyclopentadiene, hexahydronaphthalene, dimethanohexahydronaphthalene and norbornadiene dimer.

14. The method of claim 1 wherein the ratio of carbon-carbon double bonds in (b) to ≡SiH groups in the rings of (a) is in the range of about 0.7:1 up to about 1.3:1.

15. The method of claim 1 wherein the ratio of carbon-carbon double bonds in the rings of (b) to ≡SiH groups in (a) is in the range of from about 0.8:1 up to about 1.1:1.

16. The method of claim 1 wherein the platinum-containing catalyst is selected from the group consisting of chloroplatinic acid, $PtCl_2$ and dibenzonitrile platinum dichloride.

17. The method of claim 1 wherein the platinum-containing catalyst is chloroplatinic acid.

18. The method of claim 2 wherein the platinum-containing catalyst is chloroplatinic acid.

19. The method of claim 1 wherein the polymer is a thermoplastic polymer and the ratio of carbon-carbon double bonds in the rings of (B) to SiH groups in (a) is in the range of from about 0.5:1 up to about 0.7:1.

20. The method of claim 1 wherein the polymer is a thermoplastic polymer and the ratio of carbon-carbon double bonds in the rings of (b) to SiH groups in (a) is in the range of from about 1.3:1 up to about 1.8:1.

* * * * *

UNITED STATES PATENT AND TRADEMARK OFFICE
CERTIFICATE OF CORRECTION

PATENT NO. : 5,124,423
DATED : June 23, 1992
INVENTOR(S) : Raymond T. Leibfried

It is certified that error appears in the above-indentified patent and that said Letters Patent is hereby corrected as shown below:

Col. 2, lines 39 and 40, "Cyclohexasiloxane" should read --cyclohexasiloxane--;

Col. 11, line 25, " 0 024" should read --0.024--;

Col. 15, line 17, "temperature It" should read --temperature. It--;

Col. 15, line 41, "for hours at 235°" should read --for 2 hours at 235°--;

Col. 16, line 11, "120+ to 125°C." should read --120 to 125°C.--;

In the Table in Columns 17 and 18 under Ex. No. 18 opposite "Thermal DSC*", "180" should read --108--;

In the Claims, Col. 20, line 13, "of (B) to" should read --of (b) to--.

Signed and Sealed this

Nineteenth Day of July, 1994

Attest:

BRUCE LEHMAN

*Attesting Officer*    Commissioner of Patents and Trademarks